United States Patent [19]

Mascioli

[11] Patent Number: 4,461,812

[45] Date of Patent: Jul. 24, 1984

[54] LIGHTWEIGHT STORAGE BATTERY

[75] Inventor: Alessandro Mascioli, Rome, Italy

[73] Assignee: General Moped Co., Inc., New York, N.Y.

[21] Appl. No.: 320,491

[22] Filed: Nov. 12, 1981

[30] Foreign Application Priority Data

Nov. 12, 1980 [IT] Italy ............................. 50132 A/80

[51] Int. Cl.³ ........................................ H01M 12/04
[52] U.S. Cl. ................................... 429/29; 429/221
[58] Field of Search ................... 429/27, 28, 29, 190, 429/221, 44, 45, 38, 40, 39, 34

[56] References Cited

U.S. PATENT DOCUMENTS

| 2,180,839 | 11/1939 | Schumscher et al. | 429/29 |
| 3,441,442 | 4/1969 | Bushnell et al. | 429/34 |
| 4,078,120 | 3/1978 | Lindstrom | 429/27 |
| 4,078,125 | 3/1978 | Brown | 429/221 |
| 4,152,489 | 5/1979 | Chottiner | 429/44 |

Primary Examiner—Donald L. Walton
Attorney, Agent, or Firm—Lilling & Greenspan

[57] ABSTRACT

A hybrid lightweight storage battery combining aspects of conventional storage batteries and fuel cells in a manner such that the structural weight of the battery is minimized, whereas the power output is maximized in relation to the potential of the battery components.

19 Claims, 3 Drawing Figures

LIGHTWEIGHT STORAGE BATTERY

BACKGROUND OF THE INVENTION

This invention relates to a unique type of storage battery which is capable of fully exploiting the potential of its components by delivering a maximum of power in relation to the stoichiometric potential and weight of its components.

U.S. Pat. No. 3,533,845 to Katsoulis discloses a lightweight air or oxygen battery for low current, low capacity operation which can operate at temperatures as low as −40° C. The battery comprises a plurality of single cells, each made up of a consumable metal anode and a lightweight air or oxygen depolarized cathode separated by an electrolyte. The electrolyte can be a free flowing solution of aqueous potassium hydroxide (KOH), or a trapped electrolyte in a suitable matrix. The cathode is a hydrophobic membrane in contact with a conductive metal support screen and catalytic layer. The anode can be any conventional solid electroconductor employed in a metal/air or metal/oxygen cell, such as lead, zinc, iron, cadmium, aluminum or magnesium.

U.S. Pat. No. 3,515,593 to Nickols discloses a fuel cell having an asbestos matrix soaked in aqueous KOH as an electrolyte. The matrix is sandwiched between two catalyzed nickel electrodes, one serving as an anode and one serving as a cathode. The fuel cell also includes an electrically conductive backup having two members with a lamination bond at the interface surface.

U.S. Pat. No. 1,940,385 to Ackerman discloses as a negative electrode suitable in accumulators, a sintered porous iron in a framework of strips of an iron-nickel alloy.

U.S. Pat. No. 2,616,165 to Brennan discloses as an electrode, an electrolyte device which is made of a glass fiber base wherein the fibers are sheathed with a thin conductive metal coating. Substantially all the fibers making up the electrode are in circuit with each other.

U.S. Pat. No. 3,600,230 to Stachurski et al discloses a gas electrode for use in electrochemical generators of the gas depolarized and fuel cell types. The gas electrode is comprised of a porous, conductive, catalytically active layer combined with a hydrophobic, highly conductive layer. A preferred conductive material is silver in fibrous form in a matrix of carbon and hydrophobic resin.

U.S. Pat. No. 3,836,397 to Hardman discloses an iron electrode comprising 60–80 wt. % iron oxide particles having a fuse coating of an additive which can be sulfur, selenium or tellurium.

U.S. Pat. No. 3,925,100 to Buzzelli discloses an air electrode for use in metal/air rechargeable batteries. The air electrode includes a hydrophobic layer having electrochemically active materials such as high surface area carbon and a silver-mercury catalyst, and manganese dioxide.

U.S. Pat. No. 4,104,197 to Heffler discloses a gas diffusion electrode comprising a hydrophobic layer of gas permeable electrically conductive material and a hydrophobic layer containing a catalyst.

U.S. Pat. No. 4,132,547 to Buzzelli et al discloses a method for making a self-supporting activated iron electrode by thermal reduction and sintering.

U.S. Pat. No. 4,168,349 to Buzzelli discloses a method for operating an iron/air battery system with a series of horizontally disposed, flat, stationary compact cells in cooperation with a pumping means that evacuates electrolyte from the battery, rather than pumping it in.

U.S. Pat. No. 4,178,418 To Croset et al discloses a galvanic cell comprising:
(a) a first solid non-porous body capable of storing an ionisable species having a high coefficient of diffusion within the body;
(b) a first electrode made of a grid of material able to catalyze the ionisation of the ionisable species;
(c) a polycrystalline ceramic thin film layer deposited on the first body in a layer so thin as to exhibit low ohmic resistance to the current produced by said ionisable species and a relatively high ohmic resistance to the elctronic current;
(d) a second electrode made of a grid;
(e) a second body capable of receiving or furnishing the ionisable compound, producing electrical energy in the process, or generating said ionisable compound by absorbing electrical energy.

U.S. Pat. No. 4,181,776 to Lindstrom discloses an electrochemical cell containing a positive electrode and a negative electrode with electrolyte disposed in the interspace between the two electrodes, whereby at least one electrode is a gas electrode, with means for supply and discharge of an electrochemically active substance in the gaseous state.

U.S. Pat. No. 4,236,927 to Buhl et al discloses a method for manufacturing an iron sintered electrode.

U.S. Pat. No. 4,248,682 to Lindstrom et al discloses a thin electrocatalytic gas diffusion electrode and current collector assembly comprising an open pore electrically conducting carbon cloth having a coating of a uniform mixture of catalytic carbon particles and hydrophobic binder particles evenly deposited on the cloth.

Each of the above prior art materials disclose improvements in conventional storage batteries and fuel cell technology. These technologies have heretofore been distinct.

SUMMARY OF THE INVENTION

The present invention comprises a hybrid storage battery which combines aspects of conventional storage batteries and fuel cells in a manner whereby the structural weight of the battery is reduced to a minimum, yet the power output is maximized in relation to the potential of the battery components.

DISCLOSURE OF THE INVENTION

In accordance with the present invention an improved lightweight storage battery comprises
a negative electrode, preferably made of powdered iron granules;
a basic electrolyte, preferably potassium hydroxide, immobilized by an appropriate matrix;
a positive electrode, preferably made of silver or active carbon.

At first glance the lightweight storage battery of the present invention would appear to simply comprise a combination of units already existing in gas and air depolarizing cells, but obviously this is not the case at all. First of all, instead of hydrogen, which is used in gas cells, and zinc or cadmium, which are used in air depolarizing cells, the present invention requires the presence of iron which, by oxidation, forms a hydroxide completely insoluble in the basic electrolyte, and which can again be reduced to pure iron by hydrogen resulting from electrolytic decomposition of water. Iron also is produced and used as a very thin porous layer contacting the large internal surface.

In contrast, it is well known that iron as used in conventional nickel-iron batteries, also known as Edison batteries is mixed with graphite and compressed into pellets and enclosed in fragile and costly perforated steel casings. Therefore, not all the molecules in the battery are able to participate in the charge and discharge reactions, which results in useless weight.

The electrolyte, which is preferably KOH, as in other nickel-iron batteries of the known type, as well as in all primary and secondary cells of the invariable electrolyte type, consists of an extremely thin gelatinized layer reinforced by a glass cloth. This minimizes the internal resistance due to the long ion path and the difficult diffusion of pure water, a very poor conductor which is formed at the electrodes and prevents the electrolyte from penetrating into the pores of silver or active carbon.

The positive electrode, preferably made of silver or active carbon is capable of collecting oxygen from the gaseous environment, and binding it by catalytic synthesis to hydrogen ions from the electrolyte, and collecting or releasing electrons in the external circuit.

The positive electrode, also referred to as the oxygen electrode, in contast to gas cell electrodes and those using air as a depolarizer, is extremely thin and also characterized by an extremely regular pore size.

These characteristics act so as not to impede incoming ions by forming deep and relatively immobile layers of poorly conducting water, thereby making its flow very difficult in accordance with FICKS law—the quantity of material diffusing per unit time is proportional to the area and to the concentration gradient in the direction of diffusion.

The regular pore size avoids the risk of larger size pores permitting entry of excess gas into the electrolyte, and those of smaller size being flooded by the electrolyte, reducing the perimeter in which the gaseous, liquid and metallic (or conducting) phases co-exist.

In this regard, it should be noted that, while the thickness of the better known electrodes (JUSTI, CGE, etc.) is a few millimeters and in the case of air depolarizing cells often attains and exceeds several centimeters, the thickness of Ag or active carbon electrodes, according to the invention, is in the region of hundredths or tenths of a millimeter.

As compared to fuel cells, not only does the present invention offer a replacement of hydrogen, but it is also characterized by adding to the H-O reaction and to the e.m.f. of approximately 0.80 volt that is delivered by fuel cells, a preliminary iron hydroxidation reaction, which releases hydrogen and adds about 0.44 Volt to the e.m.f. of the cell.

The reactions occur in the following manner:
(a) discharging:

$Fe + 2H_2O + KOH \rightarrow Fe(OH)_2 + KOH + H_2 + 0.44\ V$ and subsequently

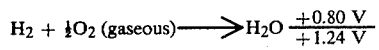

$H_2 + \tfrac{1}{2}O_2\ (\text{gaseous}) \longrightarrow H_2O\ \dfrac{+0.80\ V}{+1.24\ V}$ (b) charging:

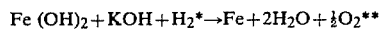

$Fe(OH)_2 + KOH + H_2{}^* \rightarrow Fe + 2H_2O + \tfrac{1}{2}O_2{}^{**}$

*resulting from decomposition of 1 molecule of $H_2O$.
**which is returned to the gaseous environment.

Another feature of the invention is the in-series connection of many elements which dispenses with heavy connections and unnecessary volumes of electrolyte, and in such a way to provide a space behind the oxygen electrode wherein the gas can move freely and thus dissolve by the shortest path and in the easiest manner in the electrolyte contained in the pores.

BRIEF DESCRIPTION OF THE DRAWINGS

Other characteristic features and advantages of the invention will become apparent from the following description of preferred embodiments of the lightweight storage battery according to the invention, which description will refer to the drawing wherein.

Figure 1:
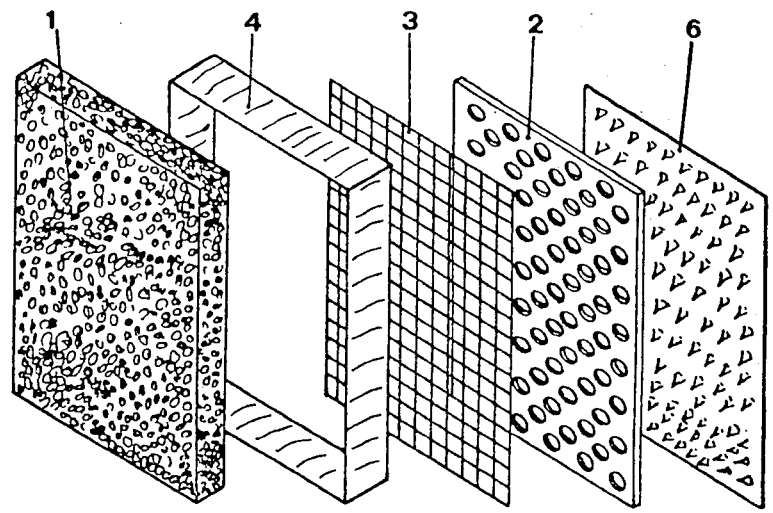
FIG. 1 shows an exploded view of the lightweight storage battery components with a silver electrode.

In accordance with the present invention, and with reference to the drawings wherein corresponding reference numbers refer to the same item, and specifically to FIG. 1, plate 1 is the thin, porous pure sintered iron electrode, separated from plate 2, the silver electrode which is a few hundredths of a millimeter thick, by the KOH electrolyte solution, gelatinized and reinforced by the internal netting 3, and enclosed on its periphery by the edges 4 to ensure a perfect seal. The gelatinized electrolyte effectively prevents direct contact between the respective electrode. The electrode 2 can be perforated by the "Photoresist" method, to provide equidistant openings whose diameter varies from 40 to 60 microns.

Figure 2:
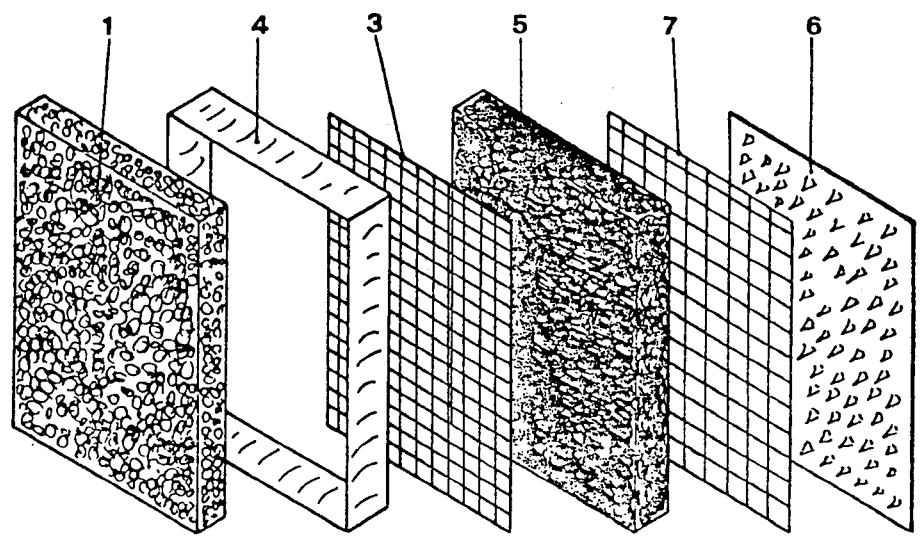
FIG. 2 shows an exploded view of the lightweight storage battery components with an active carbon electrode.

With reference to FIG. 2, containing the positive electrode variant, the electrode 5 can consist of layers of active carbon to which pure oxygen or air are conveyed, while a thin sheet 6, consisting of Fe or Cu, having projections normal to its surface, shaped into a set of pyramids, connects the various elements, with its points electrically welded to the electrode 2 or to the wire gauze 7 used as supports for the active carbon.

Figure 3:
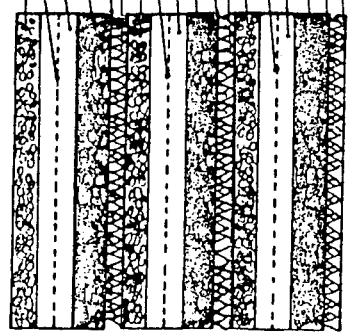
FIG. 3 shows a side view series arrangement of the assembled lightweight storage battery with an active carbon electrode, containing a plurality of unit components in series.

FIG. 3 shows an assembly of a plurality of components in series, utilizing the active carbon electrode as the positive electrode. With a series of 100 elements having a surface area of approximately 1 m², characterized by approximately 10 m A/sqcm and 1.24 V per element, a power of 12,400 Kw is attained, which is sufficient for automotive traction.

Although the invention has been described in connection with certain preferred embodiments, it will be appreciated by those skilled in the art that additions, modifications, substitutions and deletions not specifically described may be made without departing from the spirit and scope of the invention as defined in the appended claims.

What is claimed is:

1. A lightweight storage battery consisting essentially of:
   (a) a thin negative electrode consisting essentially of finely divided, porous iron;
   (b) a thin, gelatinized, sealed, immobile layer of alkali electrolyte, aligned adjacent to the positive and negative electrodes to prevent direct contact therebetween;

(c) a thin, positive electrode with means for collecting oxygen from a gaseous environment, binding said oxygen by catalytic synthesis to hydrogen ions from the electrolyte, and collecting and releasing electrons in an external circuit, said positive electrode selected from the group consisting of silver or active carbon, and wherein the silver electrode is uniformly perforated with a series of equidistant openings which vary in diameter from about 40 to 60 microns.

2. The battery of claim 1, wherein the negative electrode consists essentially of finely divided sintered iron.

3. The battery of claim 1, wherein the electrolyte consists essentially of a thin layer of gelatinized KOH, reinforced by internal netting.

4. The battery of claim 3, wherein said internal netting consists of glass cloth.

5. The battery of claim 4, wherein the KOH electrolyte has a concentration of 40% by weight.

6. The battery of claim 18 wherein the alkali electrolyte is KOH, characterized by the following reactions:

(a) discharging:

$$Fe + 2H_2O + KOH \rightarrow Fe(OH)_2 + KOH + H_2 + 0.44 \text{ V}$$

and subsequently

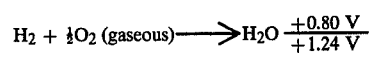

$$H_2 + \tfrac{1}{2}O_2 \text{ (gaseous)} \longrightarrow H_2O \quad \frac{+0.80 \text{ V}}{+1.24 \text{ V}}$$

(b) charging:

$$Fe(OH)_2 + KOH + H_2 \rightarrow Fe + 2H_2O + \tfrac{1}{2}O_2.$$

7. The lightweight storage battery of any of claims 1 or 3, comprising a plurality of series connected unit components.

8. The lightweight storage battery of claim 3, wherein said negative electrode forms a hydroxide which is insoluble in the basic electrolyte.

9. The battery of any of claims 1 or 3, wherein said positive electrode is silver.

10. The battery of claim 9, wherein said silver electrode is uniformly perforated with a series of equidistant openings.

11. The battery of claim 10, wherein the diameter of the openings varies from about 40 to 60 microns.

12. The battery of any of claims 1 or 3, wherein said positive electrode consists essentially of active carbon.

13. The battery of claim 12, wherein the active carbon electrode is formed from a plurality of layers of active carbon.

14. The battery of any of claims 1 or 3, also including a thin connecting sheet of iron or copper having outwardly extending projections normal to its surface which are connected to the positive electrode.

15. The battery of claim 14, wherein the projections of said connecting sheet are formed into points or pyramid layers.

16. The battery of claim 14, wherein the projections are bonded to the silver electrode.

17. The battery of claim 14, wherein the projections are connected to a gauze support for the active carbon electrode.

18. The battery of claim 1, comprising a repeating, in-series arrangement of said negative electrode, gelatinized electrolyte, and positive electrode.

19. The battery of claim 1, wherein the gaseous environment is the air.

* * * * *